UNITED STATES PATENT OFFICE.

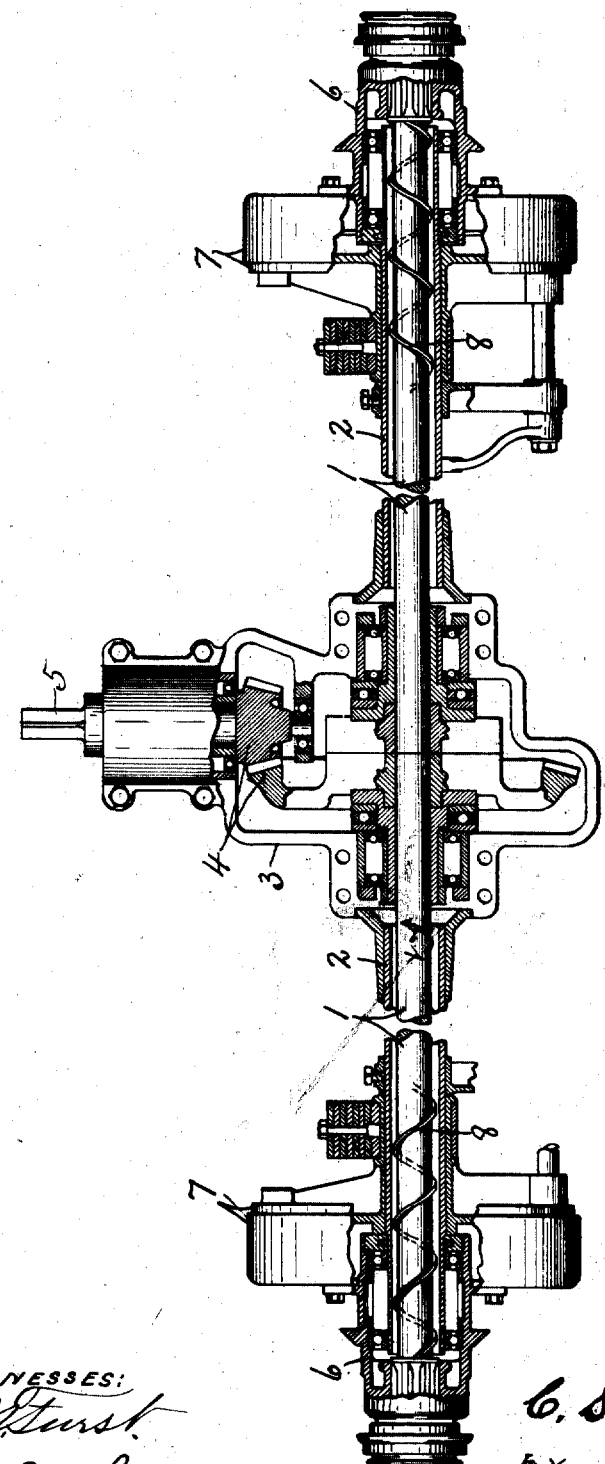

CHARLES S. WEIGELT, OF BALDWINSVILLE, NEW YORK.

FLOATING AXLE FOR AUTOMOBILES.

1,234,241.    Specification of Letters Patent.    Patented July 24, 1917.

Application filed October 1, 1913. Serial No. 792,897.

*To all whom it may concern:*

Be it known that I, CHARLES S. WEIGELT, of Baldwinsville, in the county of Onondaga, in the State of New York, have invented new and useful Improvements in Floating Axles for Automobiles, of which the following, taken in connection with the accompanying drawings, is a full, clear, and exact description.

This invention relates to certain improvements in floating or semi-floating axles for automobiles and similar machines in which motor-driven axle-sections are operated through the medium of differential gearing.

In most of the automobiles now in use, these axle-sections are mounted in a hollow casing on the rear of the truck to carry the traction wheels and suitable brake drums adjacent thereto and also the differential gears, the casing being enlarged around the gearing to protect the same against the entrance of dust and other foreign matter and to also contain a quantity of lubricant as oil, for reducing friction between the intermeshing gears.

Under this construction there is always more or less open passage or communication along the floating or semi-floating axles between the oil containing gear case and brake drums to such a degree at least that the rotary action of the gears and axles operates to force a greater or less quantity of oil from the gear case to the brake drum which not only reduces the efficiency of the brake by causing it to slip but also causes such oil to leak out from the brakes and to be spattered by centrifugal force over the adjacent parts of the machine.

The object of my invention is to obviate these objectionable results by providing each axle section with an oil-retarding device located between the end of such axle section and differential gear case to counteract any tendency of oil to flow to the brakes.

In other words, I have sought to prevent the escape of oil from the gear case to the brakes by means of spiral ribs rotating with their respective axle sections in the annular spaces between said sections and adjacent portions of the inclosing case and also between the gear case and brakes and pitched to oppose the flow of oil to the bearings for the outer ends of the axles.

Other objects and uses of the device will be brought out in the following description.

The drawing represents a longitudinal sectional view of the ends of the intermediate portions of the rear axle of an automobile including the differential gearing, brakes, and inclosing case, showing my improved oil-retarding device in operative position on the axles.

In order that my invention may be clearly understood, I have shown the rear portion of an automobile truck comprising the usual floating axle section —1— arranged end to end within a suitable housing or casing —2— having a gear case —3— inclosing the ordinary differential gears —4— for transmitting rotary motion from the main driving shaft as —5— to the axle sections —1—.

Secured to the extreme outer ends of the axle sections —1— are the usual hubs —6— of the traction wheels (not shown), said hubs being journaled in the usual manner upon the adjacent ends of the casing —2— and are also connected in the well known manner to the rotary drums of ordinary brakes —7—.

In the floating or semi-floating type of axle, there is always more or less annular space between the peripheries of the axle sections and adjacent portions of the inclosing case, thereby establishing more or less open passage or communication between the interior of the gear case and brakes so that when the machine is in action, the rotary motion of the differential gears operates in a measure to force the oil from the interior of the gear case through such spaces along the axle sections to the interior of the brake drums which not only reduces the efficiency of the brakes by causing them to slip but allows the oil to escape around the periphery of the brake drum where it is thrown or spattered by centrifugal force over the adjacent parts of the machine.

These results, coupled with the excessive waste of oil, are, of course, seriously objectionable, and in order to prevent the escape or passage of oil from the gear case to the brake drums, I have provided each axle section with a spiral rib —8— secured to the periphery thereof at points between the gear case —3— and outer ends of said axle sections, or rather between the gear case and outer ends of the housings which surround said sections so that the peripheries of the ribs will travel in close contact with the inner faces of the housings across the intervening space, said ribs being pitched to oppose the outward travel of the oil through such space.

I have found that a spiral rib of one or more turns with a suitable pitch toward the end of a shaft of approximately 45° is most effective particularly when extended through the hub of the wheel or to the end of the housing which surrounds the outer end of the axle, but I have also found that the same spiral rib arranged in the same manner at any point between the differential and outer end of the axle is sufficiently effective to prevent the passage of oil from the gear case to the brake drum and, therefore, I do not wish to limit myself to the exact relative location of this spiral rib except to one or more points on the axle between the differential gear case and point of connection between the outer end of the axle and hub of the wheel and also that this spiral rib must be located on the axle section to travel in the intervening space between such axle and the surrounding housing.

The axles are, of course, adapted to rotate in either direction but are rotated mainly in the direction indicated by arrow X in driving the machine forwardly and, in order to effectively retard or prevent the flow of oil by capillary force or otherwise from the gear case to the brake drums, the spiral at the left hand end of the sectional axle is of right hand pitch while the spiral on the right hand end of the same sectional axle is of left hand pitch, each spiral being, therefore, adapted to check the flow of oil from the gear case to the corresponding brakes through the adjacent bearings of their respective wheels.

The operation of my invention will now be readily understood upon reference to the foregoing description and the accompanying drawing and, while I have shown a particular form of floating axle and differential driving mechanism therefor, I do not limit myself to any particular form of differential nor to any particular style of axle other than that which is used in connection with a differential except that certain portions of the axle sections between the differential and outer wheel bearings and brakes are surrounded by spiral ribs rotating with their respective axle sections or at least located in the spaces between the axle sections and their respective housings so as to prevent the flow of oil from the gear case to the brakes.

What I claim is:

The combination with the rear floating axle sections, differential gearing, driving wheels and brake drums of an automobile, of spiral ribs secured directly to the periphery of said axle sections and immovable relative thereto and extending inwardly from their outer end beyond the inner ends of the brake drums and of such pitch as to feed the lubricant inwardly from the outer ends of the axle sections when the machine is propelled forwardly and to reverse the feed when the machine is propelled rearwardly, said ribs being slightly spaced from the axle casing to reduce friction and still maintain the positive return of the lubricant to the differential gear casing.

In witness whereof I have hereunto set my hand this 25th day of September, 1913.

CHARLES S. WEIGELT.

Witnesses:
H. E. CHASE,
FRANK W. BELKNAP.